C. B. FISHER.
BAIT.
APPLICATION FILED NOV. 6, 1920.
1,406,834. Patented Feb. 14, 1922.
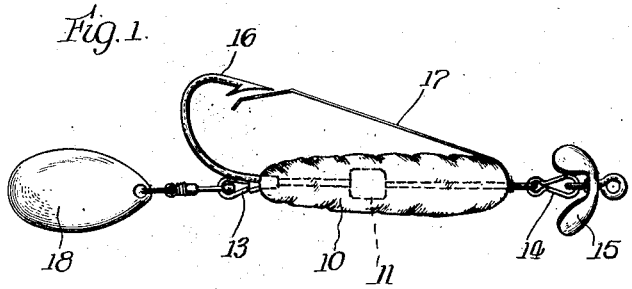
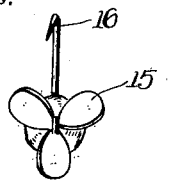
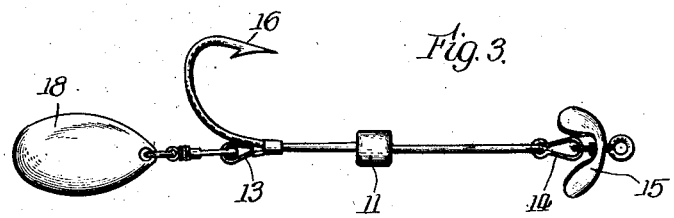
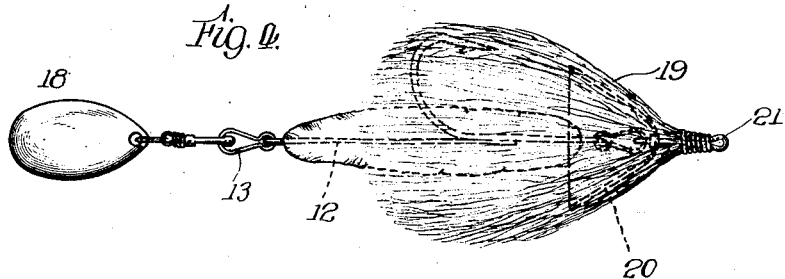
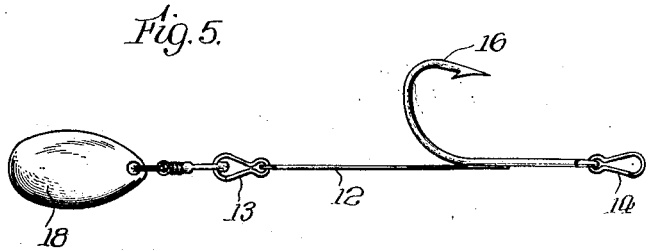
Inventor
Clarence B. Fisher,
By Wilkinson, Huxley, Byron & Knight
Attys.
Witness:
A. J. Sauser.

UNITED STATES PATENT OFFICE.

CLARENCE B. FISHER, OF CHICAGO, ILLINOIS.

BAIT.

1,406,834.  Specification of Letters Patent.  Patented Feb. 14, 1922.

Application filed November 6, 1920. Serial No. 422,144.

*To all whom it may concern:*

Be it known that I, CLARENCE B. FISHER, a citizen of the United States, residing at Chicago, in the county of Cook and State of Illinois, have invented certain new and useful Improvements in Baits, of which the following is a specification.

My invention relates to an artificial bait or lure for fishing, and has particular reference to means for attaching various kinds of spinners, bucktails and the like to either end of the bait as desired when angling for different kinds of fish.

An object of my invention is to provide an artificial bait for fishing which may be specially adaptable for casting and which is provided with suitable connections for the application of different kinds of spinners or other means for attracting the attention of fish.

Another object of my invention is to provide an artificial bait which may be readily changed as conditions require.

A further object is to improve artificial bait for successful use.

In carrying out my invention I employ a bait having a body portion with which there is incorporated a hook projecting laterally from the body, and means at each end of the body for the attachment of spinners, bucktails or other means for attracting the attention of the fish.

The novelty of the invention will be fully described and shown in the specification and drawings and particularly pointed out in the appended claims.

In the drawings,—

Figure 1 shows an elevation of a bait embodying my invention;

Figure 2 is an end elevation of Figure 1;

Figure 3 is a view showing the connection between the hook and spinners;

Figure 4 is a view similar to Figure 1 with a bucktail attached to the front end in place of the front spinner; and Figure 5 is a view similar to Figure 3 showing the hook arranged intermediate the ends of the body.

The form of the invention which I have chosen to describe herein includes a body 10 which may be of any suitable size, arrangement and color, through which extends a shaft or rod 11. The rod 11 may be the shank of the hook, as shown in Figures 1 and 3, or may comprise any part of the hook shank and an extension 12 suitably secured to the shank. At each end of the rod exteriorly of the body, snaps 13 and 14 are secured. These are integral with the rod and may be fastened thereto by soldering, welding or in any other desirable manner.

In Figures 1 and 3 the hook is shown as being placed near the rear end of the body, while in Figures 4 and 5 the hook is shown as extending laterally from the body intermediate the ends. Either construction may be employed and baits employing these constructions may be used for different kinds of fishing.

In Figures 1, 2 and 3 I have shown attached to the front snap 14 a spinner designated generally by reference character 15 and comprising three equally spaced leaves, with the leaves bent rearwardly as shown in Figure 1 to cause the spinner to turn as the bait is drawn through the water. Furthermore, by bending the leaves backwardly, weeds and the like do not catch on the spinner and thus hinder its rotation. I have found that by employing a three-leaved front spinner it is possible to reel more slowly than with a two-leaved spinner, thus adapting my bait for casting near the shore and permitting the same to be drawn through weed beds. Preferably the point of the hook 16 is protected by a spring member 17 from entanglement with weeds and the like. Attached to the rear snap 13 is another spinner 18 which usually comprises a single leaf of a common form and which may be of any size, color, shape and arrangement, according to the fishing desired.

Figure 3 shows details of construction wherein the front and back spinners may be removably attached to the rod 11 extending through the body of the bait. In Figure 4 a bucktail 19 is shown as attached to the front snap 14 in place of the spinner 15. The bucktail shown comprises a conical frame 20 to which is attached a connector 21 for the reception of the line. The frame 20 tends to keep the bucktail spread as the bait is drawn through the water, thus hiding the hook effectually. In this construction I prefer to employ a rear spinner to serve as an additional means for attracting the attention of the fish.

In Figures 4 and 5 the hook is shown as disposed laterally of the body and intermediate its ends. This arangement is desirable for certain kinds of fishing. However, the preferred form of the invention is that shown in Figures 1, 2 and 3 with the hook at the rear of the body and close to the rear spinner 18. It is desirable that the rear spinner 18 be placed as close to the hook as possible so that when a fish strikes at the flash caused by the spinner 18 it will catch on the hook, as it is at the flash that the fish strike and not at the hook.

I have fished successfully with the bait as described in this specification, especially in weed beds, and have caught fish with this bait which could not be caught with other baits in use at the present time.

It is understood that the spinners, both front and rear, may be of any color, shape and size in accordance with the fishing desired and by reason of the removable connection with the body may be changed in order to determine the best combination of spinners and colors to catch fish.

In constructing the bait, as before stated, it is desirable to use the weed protector 17, although this is not an essential part of the invention, but I have shown it as being an aid in preventing fouling of the hook when being drawn through weed beds. The body 10 may also be of any color, or may be plain or striped, as found desirable.

The frame in the bucktail makes an opening through weeds and the like permitting the bait to pass through without entanglement and also permitting the rear spinner to revolve freely. The frame may be made of wire or of wire mesh.

The bait of my invention may be used also for trolling, the kind of fishing depending on the kind of fish to be caught.

Placing the spoon or spinner at the rear of the body aids in permitting the same to revolve as the body of the bait makes a path for it.

While I have described more or less precisely the details of construction of my invention, I do not wish to be understood as limiting myself thereto, as I contemplate changes in form and proportion of parts and the substitution of equivalents as circumstances may suggest or render expedient, without departing from the spirit of my invention.

I claim:

1. An artificial bait comprising a body, a fixed shaft extending therethrough with a snap at each end thereof, and spinners removably secured to the snaps, said spinners having means for securing a line thereto.

2. A fish bait comprising a body carrying a hook, and a spinner removably supported at the rear end of the body immediately below the hook in such manner as to rotate freely with respect to said hook.

3. A fish bait comprising a body, a hook having its shank extending through said body, and spinners removably connected at each end of the body to said shank.

4. A fish bait including a body of approximately cylindrical form, a rod extending therethrough and carrying snaps at each end thereof, and a hook having its shank embedded in said body and forming a part of said rod whereby any pull on the hook may be transmitted to the rod relieving the body of such pull.

5. A fish bait having a body and a hook therein, a rod extending through said body with snaps at each end thereof, and spinners adapted for swivel connection with said catches.

6. An artificial bait comprising a body portion, a rod extending therethrough and having snaps at the ends thereof, and a spinner for removable connection with one of said snaps, said spinner having three leaves equidistantly arranged about its center and with an eye on each side thereof for attachment to a front or back snap of said bait.

Signed at Chicago, Illinois, this 30th day of October, 1920.

CLARENCE B. FISHER.